（12） United States Patent
Anand et al.

(10) Patent No.: US 8,593,341 B2
(45) Date of Patent: Nov. 26, 2013

(54) POSITION CALCULATION METHOD AND POSITION CALCULATION APPARATUS

(75) Inventors: Kumar Anand, Shiojiri (JP); Shunichi Mizuochi, Matsumoto (JP); Shuji Uchida, Shiojiri (JP); Takuya Sugimoto, Matsumoto (JP); Kenji Onda, Shiojiri (JP); Rama Sanjay, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 450 days.

(21) Appl. No.: 12/829,310

(22) Filed: Jul. 1, 2010

(65) Prior Publication Data

US 2011/0001663 A1 Jan. 6, 2011

(30) Foreign Application Priority Data

Jul. 2, 2009 (JP) .................................. 2009-158105

(51) Int. Cl.
*G01S 19/47* (2010.01)
*G01S 19/49* (2010.01)

(52) U.S. Cl.
USPC ................... 342/357.3; 342/357.32; 701/510

(58) Field of Classification Search
USPC ............... 342/357.3, 357.32; 455/456.1–457; 701/472, 500–512
See application file for complete search history.

(56) References Cited

U.S. PATENT DOCUMENTS

| 6,453,238 | B1 | 9/2002 | Brodie et al. |
| 6,487,493 | B2 | 11/2002 | Uekawa et al. |
| 6,681,176 | B2 * | 1/2004 | Funk et al. ................... 701/433 |
| 6,721,657 | B2 * | 4/2004 | Ford et al. ................... 701/472 |
| 6,999,779 | B1 | 2/2006 | Hashimoto |
| 7,233,280 | B2 * | 6/2007 | Mor et al. ................. 342/357.55 |
| 7,756,527 | B2 | 7/2010 | Hashimoto |
| 7,756,529 | B2 | 7/2010 | Hashimoto |
| 2008/0294342 | A1 | 11/2008 | Hoshizaki et al. |

FOREIGN PATENT DOCUMENTS

| CN | 101082493 A | 12/2007 |
| CN | 101097250 A | 1/2008 |
| JP | 07-253327 A | 3/1995 |
| JP | 2001-091257 A | 4/2001 |
| JP | 2001-159525 A | 6/2001 |
| JP | 2003-509671 A | 3/2003 |
| JP | 2004-272276 A | 9/2004 |
| JP | 2008-215917 A | 9/2008 |

* cited by examiner

*Primary Examiner* — Cassie Galt
(74) *Attorney, Agent, or Firm* — Kilpatrick Townsend & Stockton LLP

(57) ABSTRACT

A position calculation method and apparatus are described. The position calculation apparatus may include an inertial measurement unit and be configured to be coupled with at least one sensor unit for detecting a physical event for use in position calculation. The presence of and type sensor unit may identified, and the position processing to be undertaken may depend on this identification.

9 Claims, 13 Drawing Sheets

| OBSERVATION VALUE | UNIT | | |
|---|---|---|---|
| | IMU | GPS | DIRECTION SENSOR |
| POSITION | NO | YES | NO |
| VELOCITY | NO | YES | NO |
| POSTURE ANGLE | NO | NO | NO |
| DIRECTION | NO | NO | NO |
| ⋮ | ⋮ | ⋮ | ⋮ |

FIG. 5

| OBSERVATION VALUE | UNIT | | |
|---|---|---|---|
| | IMU | GPS | VELOCITY SENSOR |
| POSITION | NO | YES | NO |
| VELOCITY | NO | YES | YES |
| POSTURE ANGLE | NO | NO | NO |
| DIRECTION | NO | NO | NO |
| ⋮ | ⋮ | ⋮ | ⋮ |

FIG.13

| OBSERVATION VALUE | UNIT | | |
|---|---|---|---|
| | IMU | FIRST GPS | SECOND GPS |
| POSITION | NO | YES | YES |
| VELOCITY | NO | YES | NO |
| POSTURE ANGLE | NO | NO | NO |
| DIRECTION | NO | NO | NO |
| ⋮ | ⋮ | ⋮ | ⋮ |

FIG.14

POSITION CALCULATION METHOD AND POSITION CALCULATION APPARATUS

This application claims priority to Japanese Patent Application No. 2009-158105, filed Jul. 2, 2009, the entirety of which is incorporated by reference herein.

BACKGROUND

1. Technical Field

The present invention relates to a position calculation.

2. Related Art

As a positioning system using a positioning signal, a GPS (Global Positioning System) is known and used for a position calculation apparatus embedded in a mobile phone or a car navigation system. The GPS is configured such that position calculation processing is carried out, in which a three-dimensional coordinate value representing the position of the position calculation apparatus and clock errors are calculated on the basis of information about the positions of a plurality of GPS satellites or a pseudo distance from each GPS satellite to the position calculation apparatus.

In order to improve accuracy in position calculation, a technique has been suggested in which the position calculated by the GPS is corrected by using the measurement result of an inertial navigation sensor, such as an acceleration sensor or a gyro sensor, and then position calculation is carried out (for example, Japanese Patent Application No. JP-T-2003-509671).

However, as described in Japanese Patent Application No. JP-T-2003-509671, the position calculation apparatus of the related art supposes that the GPS receiving circuit and various sensors are mounted therein. The position calculation apparatus carries out predetermined arithmetic processing by using the measurement results of the GPS receiving circuit and various sensors. For this reason, the position calculation apparatus may lack flexibility regarding expansion or change of the apparatus.

SUMMARY

Techniques are described for realizing a position calculation apparatus capable of flexibly coping with expansion or change of the apparatus. A position calculation method and apparatus are described. The position calculation apparatus may include an inertial measurement unit and be configured to be coupled with at least one sensor unit for detecting a physical event for use in position calculation. The presence of and type of sensor unit may be identified, and the position processing to be undertaken may depend on this identification.

A position calculation method and apparatus may include determining whether a sensor unit for detecting a physical event for use in position calculation is mounted on the position calculation apparatus. When the determining step indicates the sensor unit is mounted on the position calculation apparatus, the type of sensor unit mounted on the position calculation apparatus is identified. When the determining step indicates the sensor unit is mounted on the position calculation apparatus, a position is calculated using an output of an inertial measurement unit integrated with the position calculation apparatus and an output of the sensor unit in accordance with the identified type of the sensor unit.

When the determining step indicates the sensor unit is not mounted on the position calculation apparatus, a position may be calculated using an output of the inertial measurement unit integrated with the position calculation apparatus. Components of the position calculation may receive calibration standard type information representing the type of calibration standard information for calibration of the sensor unit. Calibration standard information may be calculated responsive to the calibration standard type information and the output of the inertial measurement unit. The sensor unit may be calibrated by using the calibration standard information. The position may be calculated by filter processing using the output of the sensor unit.

In some embodiments, it may be determined that the sensor unit is a satellite position calculation unit configured to calculate a position by using a satellite signal from a position calculation satellite. An initialized position may be calculated by using a value other than a position calculated by the satellite position calculation unit. The initialized position may be corrected based at least in part on a position calculated by the satellite position calculation unit. Information representing a time interval at which the satellite position calculation unit calculates a position may be acquired. A prediction may include repeatedly predicting a position during the time interval, and the correction may include correcting the predicted position at the time interval.

In some embodiments, the sensor unit may be a direction sensor unit measuring a direction of the sensor unit. An angular velocity may be calculated using the received measured direction and a previously acquired direction. In some embodiments, there may be two or more types of sensor units mounted on the position calculation apparatus (e.g., a satellite position calculation unit and direction sensor unit).

BRIEF DESCRIPTION OF THE DRAWINGS

The invention will be described with reference to the accompanying drawings, wherein like members reference like elements.

FIG. 5 is a diagram showing an example of the configuration of an observation value table.

FIG. 13 is a diagram showing an example of the configuration of an observation value table according to the modification.

FIG. 14 is a diagram showing an example of the configuration of an observation value table according to the modification.

DESCRIPTION

Hereinafter, exemplary embodiments of the invention will be described with reference to the drawings. Of course, the invention not limited to the following embodiments.

1. System Configuration

Figure 1:
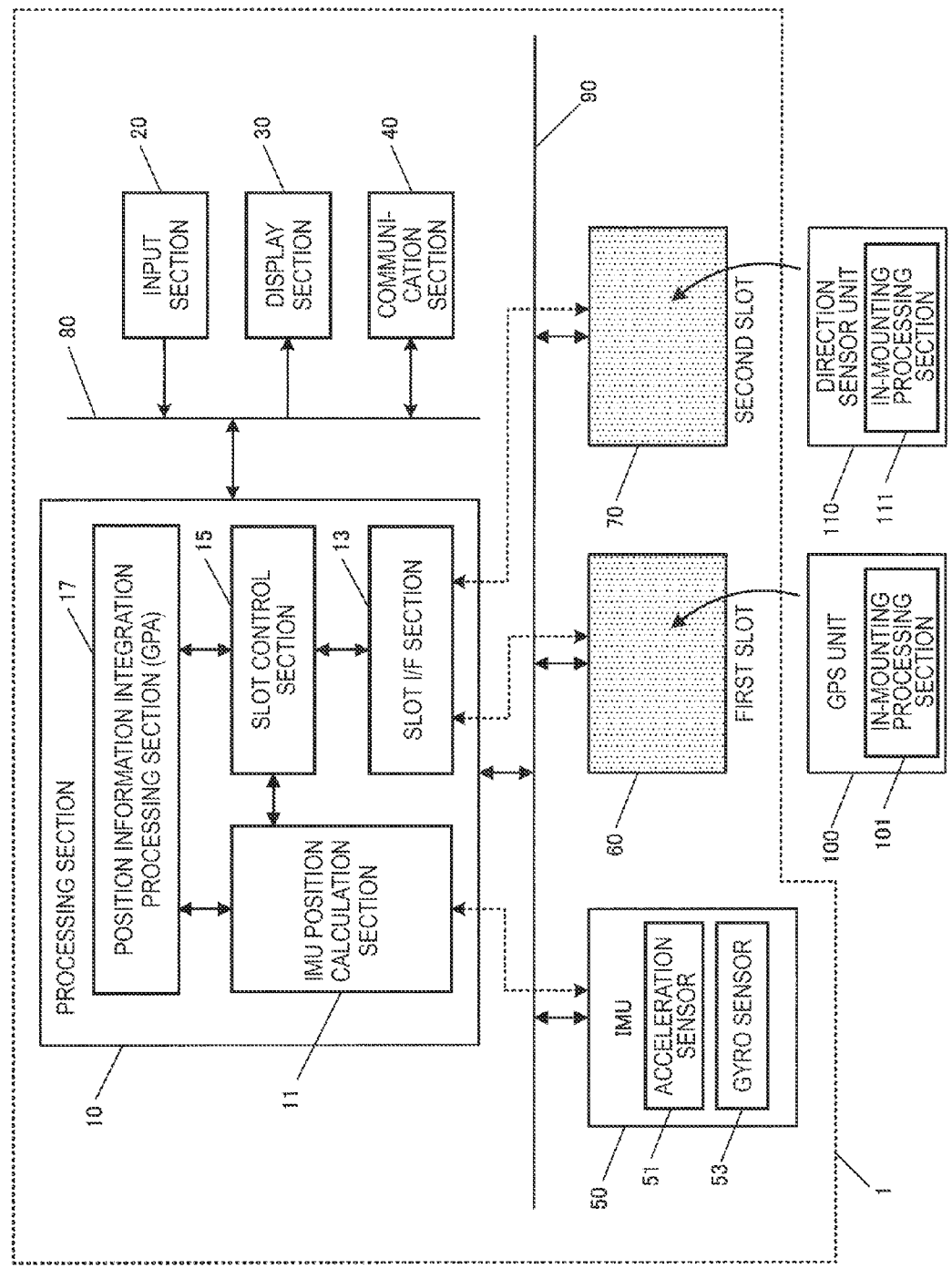
FIG. 1 is a block diagram showing the configuration of a position calculation system.

FIG. 1 is a diagram showing an example of the functional configuration of a position calculation system 1 (position calculation apparatus). The position calculation system 1 is a computer system that includes a processing section 10, an input section 20, a display section 30, a communication section 40, an IMU (Inertial Measurement Unit) 50, a first slot 60, and a second slot 70. The processing section 10, the input section 20, the display section 30, and the communication section 40 are connected to each other through a first data bus 80. The processing section 10, the IMU 50, the first slot 60, and the second slot 70 are connected to each other through a second data bus 90. Each slot may be any type of mountable feature capable of being coupled with a sensor unit directly or indirectly.

The position calculation system 1 is a kind of position calculation apparatus, and is a system (apparatus) that is applied to various electronic apparatuses, such as mobile phones including smart phones or notebook-type personal computers, PDAs (Personal Digital Assistants), car navigation systems, portable navigation systems, in which a GPS (Global Positioning System) unit can be mounted.

The processing section 10 is a control device that performs overall control of the position calculation system 1. The processing section 10 includes, as the functional sections, an IMU position calculation section 11, a slot I/F (Inter Face) section 13, a slot control section 15, and a position information integration processing section (hereinafter, referred to as "GPA (Generic Position Algorithm)") 17. As used herein, the term "section" may refer to one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. Each section may also be implemented, in whole or in part, with instructions embodied in a memory, formatted to be executed by one or more general or application-specific processors.

The IMU position calculation section 11 is a functional section that carries out inertial navigation arithmetic processing by using data about acceleration and angular velocity output from the IMU 50 to calculate position or velocity. This function is realized by a processor, such as a CPU (Central Processing Unit) or a DSP (Digital Signal Processor). The IMU position calculation section 11 transmits and receives various kinds of data to/from the slot control section 15.

The slot I/F section 13 is a functional section for realizing an input/output interface for units (hereinafter, referred to as "mounted units") mounted in the first slot 60 and the second slot 70. With regard to the flow of data, the slot I/F section 13 connects the mounted units and the slot control section 15.

The slot control section 15 is a functional section that acquires output information from the mounted units through the slot I/F section 13, calculates information for position calculation by the IMU position calculation section 11 and outputs the calculated information to the IMU position calculation section 11, or calculates information (hereinafter, referred to as "calibration standard information") as the standard for calibration of the mounted units by using output information from the IMU position calculation section 11 or output information from the GPA 17. This function is realized by a processor, such as a CPU or a DSP.

The GPA 17 is a functional section that carries out predetermined filter processing by using output information from the IMU position calculation section 11 and output information from the slot control section 15 to integrate and calculate position or velocity. This function is realized by a processor, such as a CPU or a DSP. In one embodiment, the GPA 17 carries out position integration processing using a Kalman filter as an example of filter processing to calculate a position.

The input section 20 is an input device that includes a touch panel and button switches. The input section 20 outputs a signal corresponding to a pressed key or button to the processing section 10. Various instructions, such as a position calculation request, are input by an operation input from the input section 20.

The display section 30 includes an LCD (Liquid Crystal Display) or the like. The display section 30 is a display device that performs various kinds of display based on display signals input from the processing section 10. A position display screen or time information is displayed on the display section 30.

The communication section 40 is a communication device that allows the position calculation system 1 to perform communication with an external apparatus under the control of the processing section 10. This function is realized by a wired communication module or a wireless communication module, such as wireless LAN based on IEEE 802.11 or wireless communication using spread spectrum. When the position calculation system 1 is applied to a mobile phone, the communication section 40 may be a communication device for a mobile phone.

The IMU 50 is an inertial measurement unit that includes an acceleration sensor 51 and a gyro sensor 53, and is configured to detect acceleration in the axial direction of each of the orthogonal three axes and angular velocity around each axis. The acceleration sensor 51 and the gyro sensor 53 respectively measure acceleration and angular velocity. An error (hereinafter, referred to as "acceleration error") included in the measured acceleration and an error (hereinafter, referred to as "angular velocity error") included in the angular velocity are measured, or the values thereof are set and stored in advance.

The IMU 50 outputs acceleration, angular velocity, acceleration error, angular velocity error, and time (measurement time), at which the measurement is made, to the IMU position calculation section 11. In one embodiment, the IMU 50 outputs data at a time interval of "0.01 sec". That is, the output time interval of data of the IMU 50 is "0.01 sec". The acceleration sensor 51 and the gyro sensor 53 may be separate sensors or an integrated sensor.

The first slot 60 and the second slot 70 are kinds of sockets in which a position calculation unit or various sensor units can be mounted. In one embodiment, a GPS unit 100 and a direction sensor unit 110, which are examples of sensor units for detecting a physical event for use in position calculation, are mounted in the slots.

A GPS unit 100 is a kind of satellite position calculation unit, and carries out predetermined position calculation by using a GPS satellite signal output from a GPS satellite, which is a type of a position calculation satellite, to calculate a position. The GPS unit 100 includes an in-mounting processing section 101 that transmits/receives data to/from the position calculation system 1 when the GPS unit 100 is mounted in the first slot 60 or the second slot 70.

The direction sensor unit 110 is a unit that includes, for example, a terrestrial magnetism sensor, and detects a terrestrial magnetism to detect a magnetic direction. Similarly to the GPS unit 100, the direction sensor unit 110 includes an in-mounting processing section 111.

2. Flow of Processing

Figure 2:
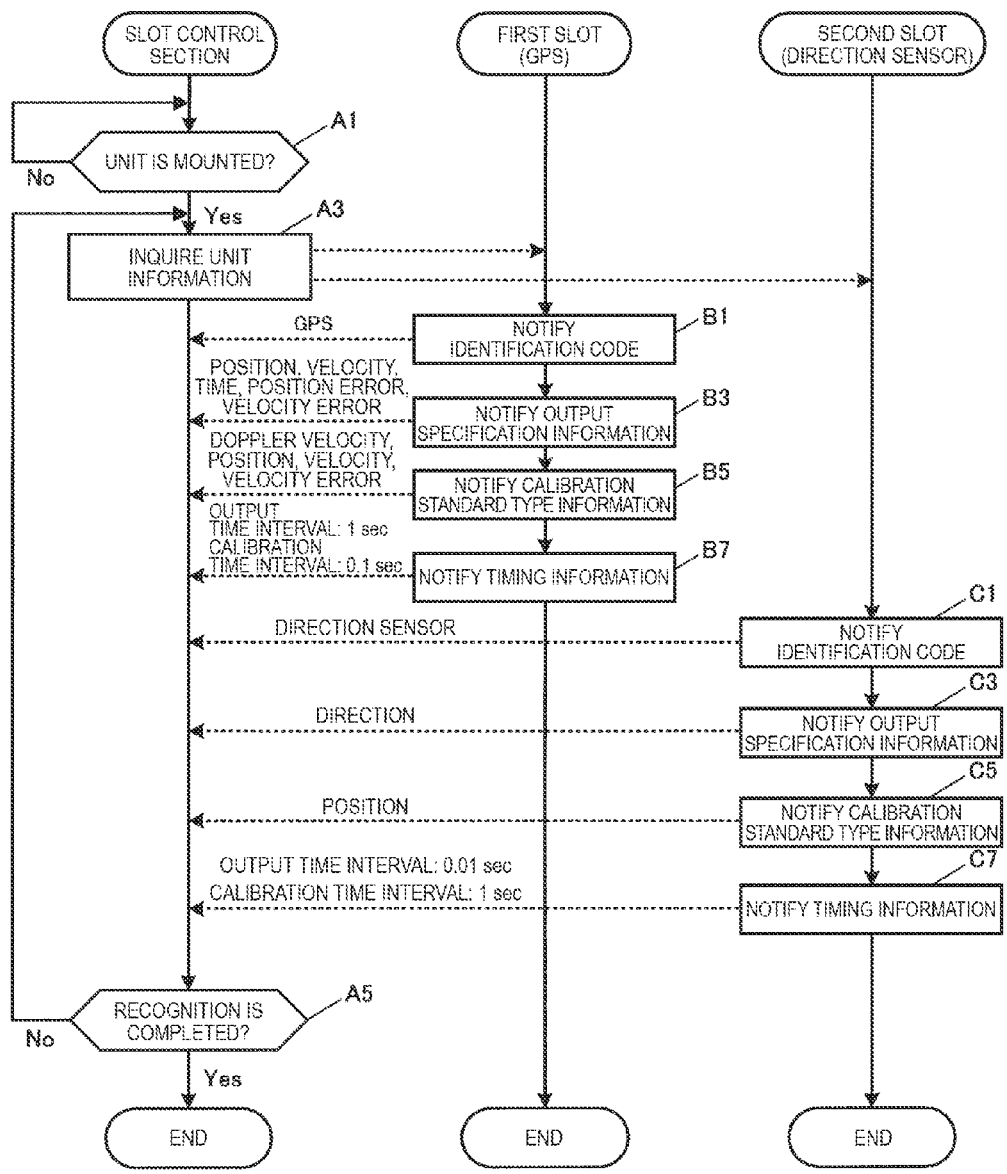
FIG. 2 is a flowchart showing a flow of recognition processing.

FIG. 2 is a flowchart showing an example flow of recognition processing of a mounted unit that is executed by the position calculation system 1. In this case, an example where the GPS unit 100 is mounted in the first slot 60 and the direction sensor unit 110 is mounted in the second slot 70 will be described. A flow of processing by the slot control section 15 is shown on the left side of the drawing, a flow of processing by the in-mounting processing section 101 of the GPS unit 100 is shown on the center of the drawing, and a flow of processing by the in-mounting processing section 111 of the direction sensor unit 110 is shown on the right side of the drawing.

First, the slot control section 15 determines whether or not a unit is mounted in the first slot 60 or the second slot 70 (Step A1), and when it is determined that a unit is mounted (Step A1: Yes), inquires unit information of the unit mounted in the relevant slot (Step A3). A method of detecting whether or not a unit is mounted in the first slot 60 or the second slot 70 may be realized by, for example, a method of sensing electrical connection when a unit is mounted.

The in-mounting processing section 101 of the GPS unit 100 which is mounted in the first slot 60 receives the inquiry from the slot control section 15 notifies the slot control section 15 of an identification code, output specification information, calibration standard type information, and timing information as unit information (Steps B1 to B7).

The identification code is identification information for uniquely identifying each type of unit, and is allocated by the unit type in advance. The output specification information is information that represents the type of data output from the relevant unit. The calibration standard type information is information that represents the type of data necessary for calibration of the relevant unit. Data (the parameter value of the relevant type) regarding the type represented by the calibration standard type information is referred to as "calibration standard information", which is distinguished from calibration standard type information. The timing information is information that includes an output time interval, which is a time interval of data from the relevant unit, and a calibration time interval, which is a time interval of calibration of the relevant unit.

In one embodiment, the in-mounting processing section 101 of the GPS unit 100 notifies "GPS" as an identification code (Step B1). As the output specification information of the GPS unit 100, "position, velocity, time, position error, and velocity error" are notified (Step B3). The kinds of data output from the GPS unit 100 include position, velocity, time, position error, and velocity error.

The in-mounting processing section 101 of the GPS unit 100 notifies "Doppler velocity, position, velocity, and velocity error" as calibration standard type information (Step B5). That is, the kinds of data necessary for calibration of the GPS unit 100 include Doppler velocity, position, velocity, and velocity error.

The in-mounting processing section 101 of the GPS unit 100 notifies "output time interval: 1 sec, calibration time interval: 0.1 sec" as timing information (Step B7). That is, the GPS unit 100 outputs data at intervals of one second and carries out calibration at every 0.1 sec.

Similarly, the in-mounting processing section 111 of the direction sensor unit 110 notifies "direction sensor" as an identification code (Step C1). As the output specification information of the direction sensor unit 110, "direction" is notified (Step C3), and as the calibration standard type information, "position" is notified (Step C5). The in-mounting processing section 111 notifies "output time interval: 0.01 sec, calibration time interval: 1 sec" as timing information (Step C7). In one embodiment, therefore, the output time interval and the calibration time interval can be determined for each unit.

If unit information is notified from a unit mounted in each slot, the slot control section 15 determines whether or not recognition of a mounted unit is completed (Step A5), and when it is determined that recognition is not completed (Step A5: No), returns to Step A3. When it is determined that recognition is completed (Step A5: Yes), the recognition processing ends.

Figure 3:
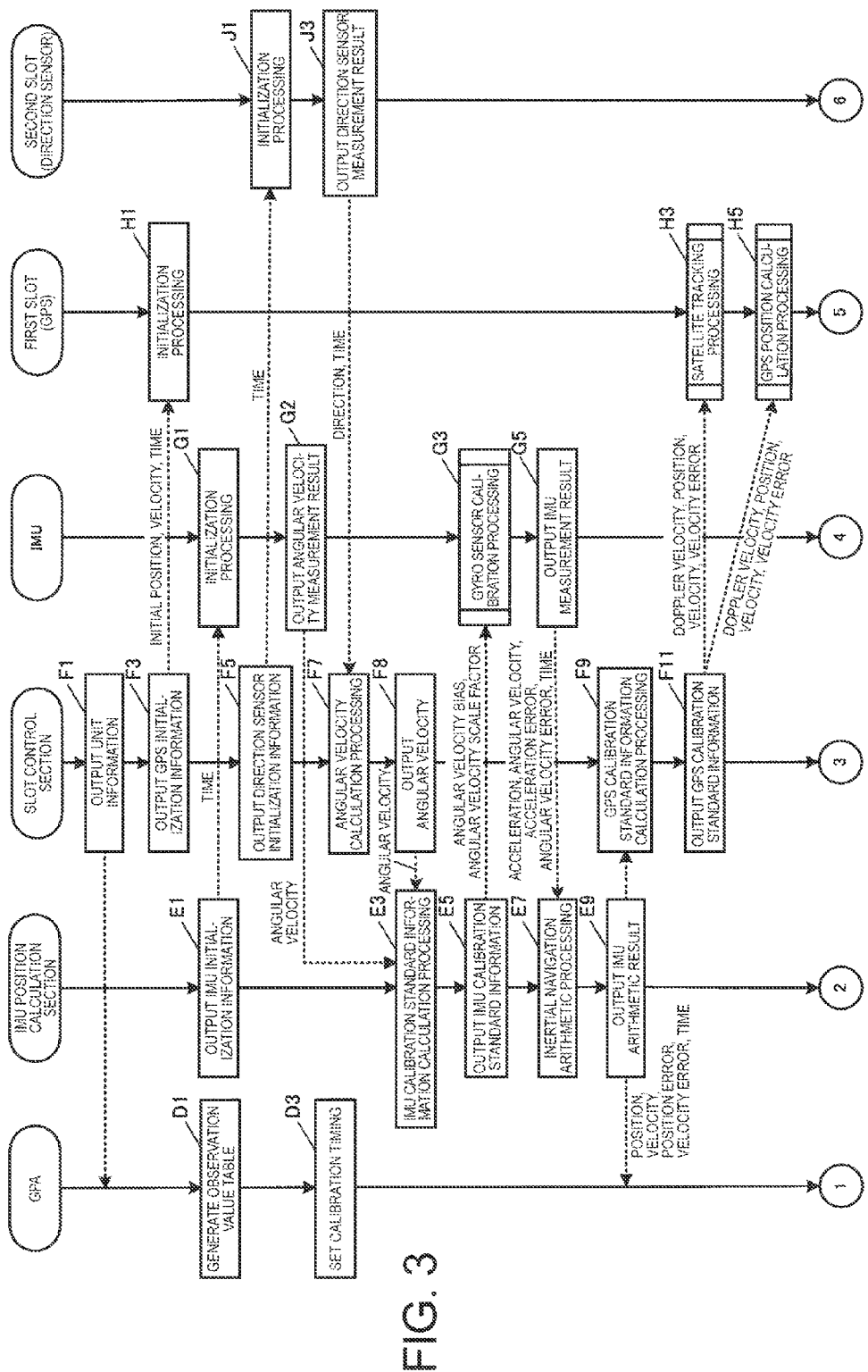
FIG. 3 is a flowchart showing a flow of position calculation processing.
Figure 4:
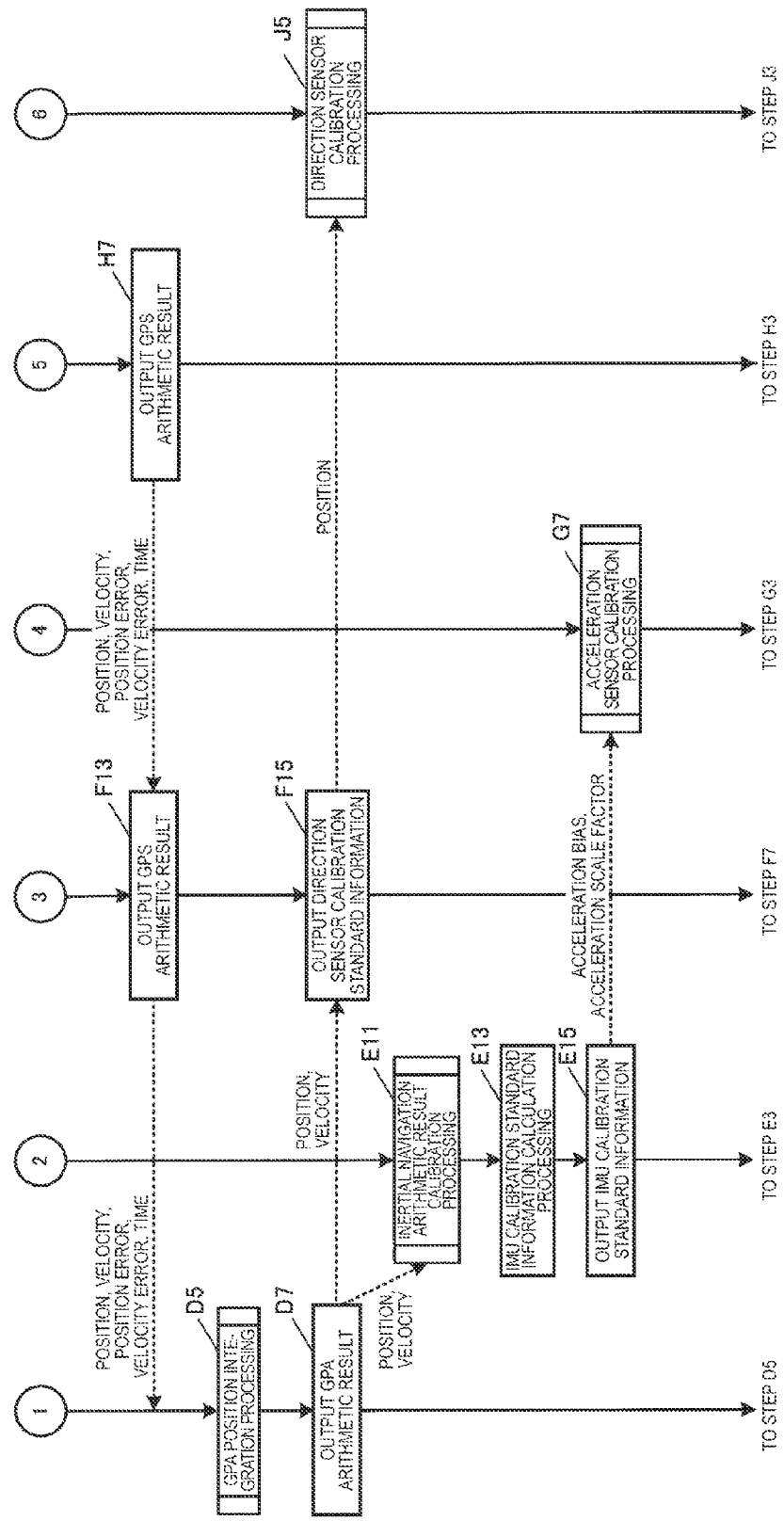
FIG. 4 is a flowchart showing a flow of position calculation processing.

FIGS. 3 and 4 are flowcharts showing a flow of position calculation processing according to some embodiments. In this case, an example where the GPS unit 100 is mounted in the first slot 60, and the direction sensor unit 110 is mounted in the second slot 70 will be described. A flow of processing by the GPA 17, a flow of processing by the IMU position calculation section 11, a flow of processing by the slot control section 15, a flow of processing by the IMU 50, a flow of processing by the in-mounting processing section 101 of the GPS unit 100 mounted in the first slot 60, and a flow of processing by the in-mounting processing section 111 of the direction sensor unit 110 mounted in the second slot 70 are shown from the left side of the drawing toward the right side.

First, the slot control section 15 outputs unit information acquired from each mounted unit to the GPA 17 (Step F1). If unit information is acquired from the slot control section 15, the GPA 17 generates an observation value table by using the relevant unit information (Step D1). The observation value table is a table in which parameters are set which are used as observation values (external observation values) when the GPA 17 carries out correction processing using a Kalman filter during GPA position integration processing described below.

FIG. 5 is a diagram showing an example of the configuration of an observation value table. The observation value table sets whether parameters are used as observation values or not in association with the types of a plurality of parameters as candidates of observation values for each unit. A parameter which is used as an observation value is marked with "◯", and a parameter which is not used as an observation value is marked with "x".

For example, in the observation value table of FIG. 5, the position and velocity associated with the GPS unit 100 are marked with "◯". This means that the position and velocity measured by the GPS unit 100 are used as observation values during GPA integration processing. Thus, in one embodiment, the measurement result of the GPS unit 100 is used as an observation value, and the measurement results of the IMU 50 and the direction sensor unit 110 are not used as an observation value.

Returning to FIG. 3, the GPA 17 sets a correction timing by using the observation value table set in Step D1 (Step D3). Specifically, in the observation value table, a unit with an observation value marked with "◯" is specified. The timing at which correction processing is carried out with the measurement result from the specified unit as an observation value is set as the timing of the time interval of data output of the relevant unit.

For example, in the observation value table of FIG. 5, with regard to the GPS unit 100, the position and velocity are marked with "◯". For this reason, correction processing is carried out by using the measurement result from the GPS unit 100 as an observation value. The timing of the correction processing is set to the timing at every one second, which is the output time interval of data of the GPS unit 100.

Next, the slot control section 15 outputs GPS initialization information, which is information for initialization of the GPS unit 100, to the GPS unit 100 (Step F3). Specifically, information about "initial position, velocity, and time" is output to the GPS unit 100 as the GPS initialization information. If the GPS initialization information is acquired from the slot control section 15, the in-mounting processing section 101 of the GPS unit 100 carries out processing for initializing the GPS unit 100 by using the relevant information (Step H1).

The slot control section 15 outputs direction sensor initialization information, which is information for initialization of the direction sensor unit 110, to the direction sensor unit 110 (Step F5). Specifically, information about "time" is output to the direction sensor unit 110 as direction sensor initialization information. If the direction sensor initialization information is acquired from the slot control section 15, the in-mounting processing section 111 of the direction sensor unit 110 carries out processing for initializing the direction sensor unit 110 by using the relevant information (Step J1).

The IMU position calculation section 11 outputs IMU initialization information, which is information for initialization of the IMU 50, to the IMU 50 (Step E1). Specifically, information about "time" is output to the IMU 50 as the IMU initialization information. A processing section of the IMU 50 carries out processing for initializing the IMU 50 (Step G1).

Next, the in-mounting processing section 111 of the direction sensor unit 110 outputs the direction, which is the measurement result of the direction sensor, and the measurement time to the slot control section 15 through the slot I/F section 13 as the direction sensor measurement result (Step J3).

If the measurement result is acquired from the direction sensor unit 110, the slot control section 15 carries out processing for calculating angular velocity on the basis of the previously acquired direction and the currently acquired direction (Step F7). For example, angular velocity is calculated by differential calculation for calculating a variation in direction per unit time. The slot control section 15 outputs the calculated angular velocity to the IMU position calculation section 11 (Step F8). The IMU 50 outputs angular velocity measured by the gyro sensor 53 to the IMU position calculation section 11 (Step G2).

If the angular velocities are acquired from the IMU 50 and the slot control section 15, the IMU position calculation section 11 calculates IMU calibration standard information, which is calibration standard information for the IMU 50, by using the acquired angular velocities (Step E3). Specifically, a known error calculation arithmetic operation is carried out by using the angular velocity acquired from the slot control section 15 and the angular velocity acquired from the IMU 50 to calculate the angular velocity bias and angular velocity scale factor, which are kinds of error parameters of the gyro sensor 53.

Although the bias and the scale factor of the sensor are known and thus detailed description thereof will be omitted, the bias means the output value of the sensor under a certain operation condition (for example, at the time of stoppage), and the scale factor means the sensitivity of the sensor, that is, the ratio of an output change to an input change of a physical amount to be measured.

Next, the IMU position calculation section 11 outputs the calculated IMU calibration standard information to the IMU 50 (Step E5). If the IMU calibration standard information is acquired from the IMU position calculation section 11, the IMU 50 carries out calibration processing of the gyro sensor 53 (Step G3).

Specifically, the IMU 50 updates the angular velocity bias stored in the apparatus to the angular velocity bias acquired by the IMU position calculation section 11. The IMU 50 also updates the stored angular velocity scale factor to the acquired angular velocity scale factor. The angular velocity measured by the gyro sensor 53 is calibrated by using the updated angular velocity bias and angular velocity scale factor.

Next, the IMU 50 outputs the acceleration, angular velocity, acceleration error, angular velocity error, and measurement time, which are the measurement results by the acceleration sensor 51 and the gyro sensor 53, to the IMU position calculation section 11 as an IMU measurement result (Step G5). If the IMU measurement result is acquired, the IMU position calculation section 11 carries out known inertial navigation arithmetic processing by using the relevant IMU measurement result to calculate position, velocity, and errors, which may be included in the position and velocity (Step E7). The calculated position and velocity, position error and velocity error, and calculation time are output to the GPA 17 and the slot control section 15 as an IMU arithmetic result (Step E9).

If the IMU arithmetic result is acquired from the IMU position calculation section 11, the slot control section 15 carries out GPS calibration standard information calculation processing for calculating GPS calibration standard information by using the relevant IMU arithmetic result (Step F9). Specifically, the Doppler velocity, which is the relative velocity between the position calculation system 1 and the GPS satellite, is calculated by using the position and velocity included in the IMU arithmetic result, and the satellite position and satellite velocity of the GPS satellite.

The satellite position and satellite velocity may be calculated by using the previously acquired satellite orbit information (almanac or ephemeris) and current time. The slot control section 15 outputs the calculated Doppler velocity, and the position, velocity, and velocity error included in the IMU arithmetic result to the GPS unit 100 as GPS calibration standard information (Step F11).

If the GPS calibration standard information is acquired from the slot control section 15, the in-mounting processing section 101 of the GPS unit 100 carries out satellite tracking processing by using the relevant GPS calibration standard information (Step H3). Specifically, the search center frequency of the GPS satellite signal and the frequency search range are determined by using the Doppler velocity included in the GPS calibration standard information.

In detail, a frequency that is obtained by adding a frequency error for the Doppler velocity to the carrier frequency of the GPS satellite signal, 1.57542 [GHz], is determined as the search center frequency. Therefore, an accurate search center frequency can be set, to which the Doppler velocity according to movement of the position calculation system 1 is added, such that the time necessary for tracking the GPS satellite signal can be reduced.

The frequency search range of the GPS satellite signal is determined by using the velocity and velocity error included in the GPS calibration standard information. In the case of tracking the GPS satellite signal, a correlation arithmetic operation is carried out on the replica code and the GPS satellite signal while changing the search frequency of the GPS satellite signal, such that a peak value of correlation values is calculated. Therefore, the frequency search width is calculated by adding the velocity and velocity error of the position calculation system 1 included in the GPS calibration standard information, and a frequency range having a width corresponding to the calculated search width with the search center frequency as a center is determined as the frequency search range.

Next, the in-mounting processing section 101 of the GPS unit 100 carries out GPS position calculation processing (Step H5). Specifically, a known position calculation arithmetic operation (position convergence arithmetic operation) using a pseudo distance is carried out with the position included in the GPS calibration standard information as the initial position to calculate a position. At this time, the distance between the satellite position of the GPS satellite calculated by using satellite orbit information and the position of the position calculation system 1 included in the GPS calibration standard information is calculated, and the calculated distance is divided by light speed to calculate the integer part of the pseudo distance. The fractional part of the pseudo distance is calculated from a code phase obtained by the correlation arithmetic operation of the GPS satellite signal and the replica code. The integer part and the fractional part are added to calculate the pseudo distance.

Position calculation is carried out with the position acquired through inertial navigation arithmetic processing by the IMU position calculation section 11 as the initial position, and the integer part of the pseudo distance is calculated by using the relevant position. Therefore, convergence in the position convergence arithmetic operation is improved, and an accurate position is calculated. Although detailed description is omitted, in the GPS position calculation processing, known velocity calculation using temporal changes of the Doppler frequency is carried out to calculate the velocity of the position calculation system 1. Further, known error calculation is carried out to calculate errors included in the calculated position and velocity.

After the GPS position calculation processing is carried out, the in-mounting processing section 101 of the GPS unit 100 outputs the calculated position, velocity, position error, velocity error, and time to the slot control section 15 as a GPS arithmetic result (Step H7). The slot control section 15 outputs the GPS arithmetic result acquired from the GPS unit 100 to the GPA 17 (Step F13).

If the GPS arithmetic result is acquired from the slot control section 15, the GPA 17 carries out GPA position integration processing (Step D5). The GPA position integration processing is processing in which the position and velocity calculated by the IMU position calculation section 11 using the Kalman filter and the position and velocity calculated by the GPS unit 100 are integrated.

FIGS. 3 and 4 show a processing flow of the respective functional sections following the processing of FIG. 2. Thus, FIGS. 3 and 4 show an example flow of processing when the GPS unit 100 is mounted in the position calculation system 1. When the GPS unit 100 is not mounted in the position calculation system 1, information about position and velocity is not output from the GPS unit 100 to the GPA 17, and only the position and velocity calculated through the inertial navigation arithmetic processing by the IMU position calculation section 11 are output to the GPA 17. In this case, the GPA 17 does not carry out position integration processing, and calculates position and velocity by using the output of the IMU position calculation section 11. For example, the position and velocity output from the IMU position calculation section 11 may be obtained as the final calculation result as they are, or the position and velocity output from the IMU position calculation section 11 may be corrected on the basis of the histories of the previous calculation result of position and velocity and obtained as the final calculation result.

Figure 6:
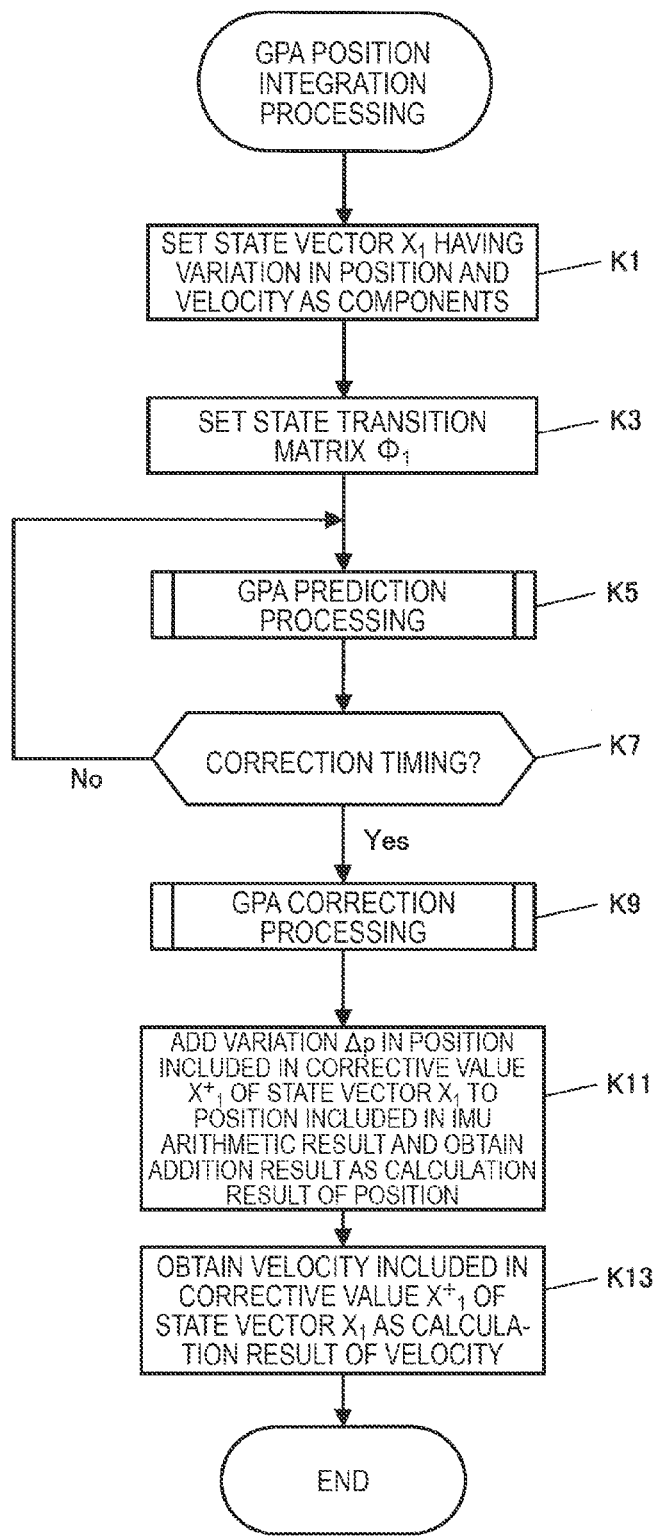
FIG. 6 is a flowchart showing a flow of GPA position integration processing.

FIG. 6 is a flowchart showing an example flow of GPA position integration processing.

First, the GPA 17 sets a state vector "$X_1$" that has variation in position and velocity as components and is expressed by Equation (1) (Step K1).

$$X_1 = \begin{bmatrix} \Delta p_{east} \\ \Delta p_{north} \\ \Delta p_{up} \\ v_{east} \\ v_{north} \\ v_{up} \end{bmatrix} \quad (1)$$

In Equation (1), "$\Delta p_{east}$", "$\Delta p_{north}$", and "$\Delta p_{up}$" respectively indicate variations in position in the east-west direction, the south-north direction, and the zenith direction. "$v_{east}$", "$v_{north}$", and "$v_{up}$" respectively indicate velocities in the east-west direction, the south-north direction, and the zenith direction.

Next, the GPA 17 sets a state transition matrix "$\phi_1$" that is expressed by Equation (2) (Step K3). The state transition matrix "$\phi$" is a matrix that indicates transition of the respective components included in the state vector "X".

$$\phi_1 = \begin{bmatrix} 0 & 0 & 0 & \Delta t & 0 & 0 \\ 0 & 0 & 0 & 0 & \Delta t & 0 \\ 0 & 0 & 0 & 0 & 0 & \Delta t \\ 0 & 0 & 0 & 1 & 0 & 0 \\ 0 & 0 & 0 & 0 & 1 & 0 \\ 0 & 0 & 0 & 0 & 0 & 1 \end{bmatrix} \quad (2)$$

In Equation (2), "$\Delta t$" is the output time interval of data from the IMU 50.

The GPA 17 carries out GPA prediction processing in which a prediction arithmetic operation using a Kalman filter is carried out (Step K5).

Figure 7:
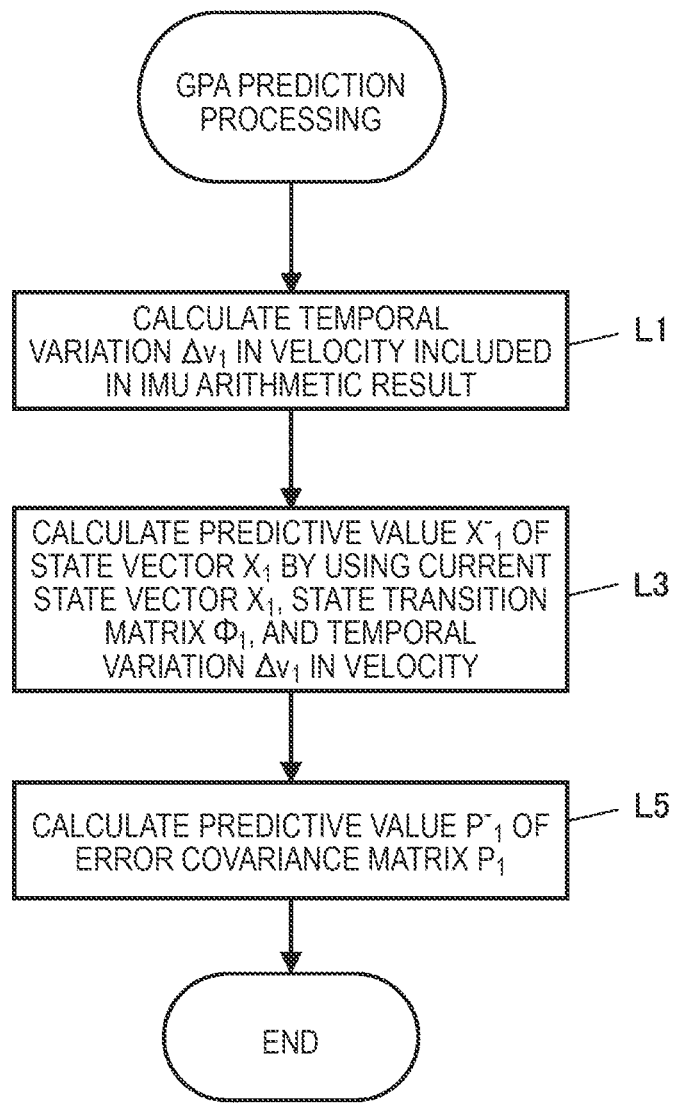
FIG. 7 is a flowchart showing a flow of GPA prediction processing.

FIG. 7 is a flowchart showing an example flow of GPA prediction processing.

First, the GPA 17 calculates the difference between the velocity included in the IMU arithmetic result currently acquired from the IMU position calculation section 11 and the velocity included in the IMU arithmetic result previously acquired from the IMU position calculation section 11 as variation "$\Delta v_1$" in velocity (Step L1).

The GPA 17 calculates a predictive value "$X^-_1$" of the state vector by using the current state vector "$X_1$", the state transition matrix "$\phi_1$" set in Step K3, and the variation "$\Delta v_1$" in velocity calculated in Step L1 in accordance with Equation (3) (Step L3).

$$X^-_{t+1} = \phi_1 X^-_t + X^{IMU}_t \quad (3)$$

$$\begin{bmatrix} \Delta p_{east} \\ \Delta p_{north} \\ \Delta p_{up} \\ v_{east} \\ v_{north} \\ v_{up} \end{bmatrix}_{t+1} = \begin{bmatrix} 0 & 0 & 0 & \Delta t & 0 & 0 \\ 0 & 0 & 0 & 0 & \Delta t & 0 \\ 0 & 0 & 0 & 0 & 0 & \Delta t \\ 0 & 0 & 0 & 1 & 0 & 0 \\ 0 & 0 & 0 & 0 & 1 & 0 \\ 0 & 0 & 0 & 0 & 0 & 1 \end{bmatrix} \begin{bmatrix} \Delta p_{east} \\ \Delta p_{north} \\ \Delta p_{up} \\ v_{east} \\ v_{north} \\ v_{up} \end{bmatrix}_t + \begin{bmatrix} 0 \\ 0 \\ 0 \\ \Delta v^{IMU}_{east} \\ \Delta v^{IMU}_{north} \\ \Delta v^{IMU}_{up} \end{bmatrix}$$

In Equation (3), a superscript "−" indicates a predictive value. A subscript "t" indicates time, that is, time for every output time interval of data from the IMU 50. "$X^{IMU}$" indicates the bias of the state vector, which is set by using the IMU arithmetic result. "$\Delta v^{IMU}_{east}$", "$\Delta v^{IMU}_{north}$", and "$\Delta v^{IMU}_{up}$" included in "$X^{IMU}$" respectively indicate variations in velocity (respective components of $\Delta v_1$) in the east-west direction, the south-north direction, and the zenith direction. In "$X^{IMU}$", the positional components in the east-west direction, the south-north direction, and the zenith direction are all "0". That is, the prediction arithmetic operation is carried out on the assumption that there is no variation in position.

The GPA 17 carries out an arithmetic operation to predict an error covariance matrix "$P_1$" on the basis of a Kalman filter (Step L5). Then, the GPA 17 ends the GPA prediction processing.

Returning to FIG. 6, after the GPA prediction processing is carried out, the GPA 17 determines whether or not the correction timing is reached (Step K7). That is, it is determined whether or not the correction timing set in Step D3 is reached. When the correction timing is not reached (Step K7: No), the process returns to Step K5, and the GPA prediction processing is carried out again.

In one embodiment, the timing at every "one second" that is the output time interval of data of the GPS unit 100 is set as the correction timing. Meanwhile, the IMU arithmetic result is output from the IMU position calculation section 11 at the time interval of "0.01 sec". Therefore, the prediction arithmetic operation can be carried out 100 times during one second by using the IMU arithmetic result output from the IMU position calculation section 11 at the time interval of 0.01 sec. For this reason, in one embodiment, during the correction timing is reached once, the GPA prediction processing is repeatedly carried out 100 times.

When it is determined in Step K7 that the correction timing is reached (Step K7: Yes), the GPA 17 carries out GPA correction processing (Step K9).

Figure 8:
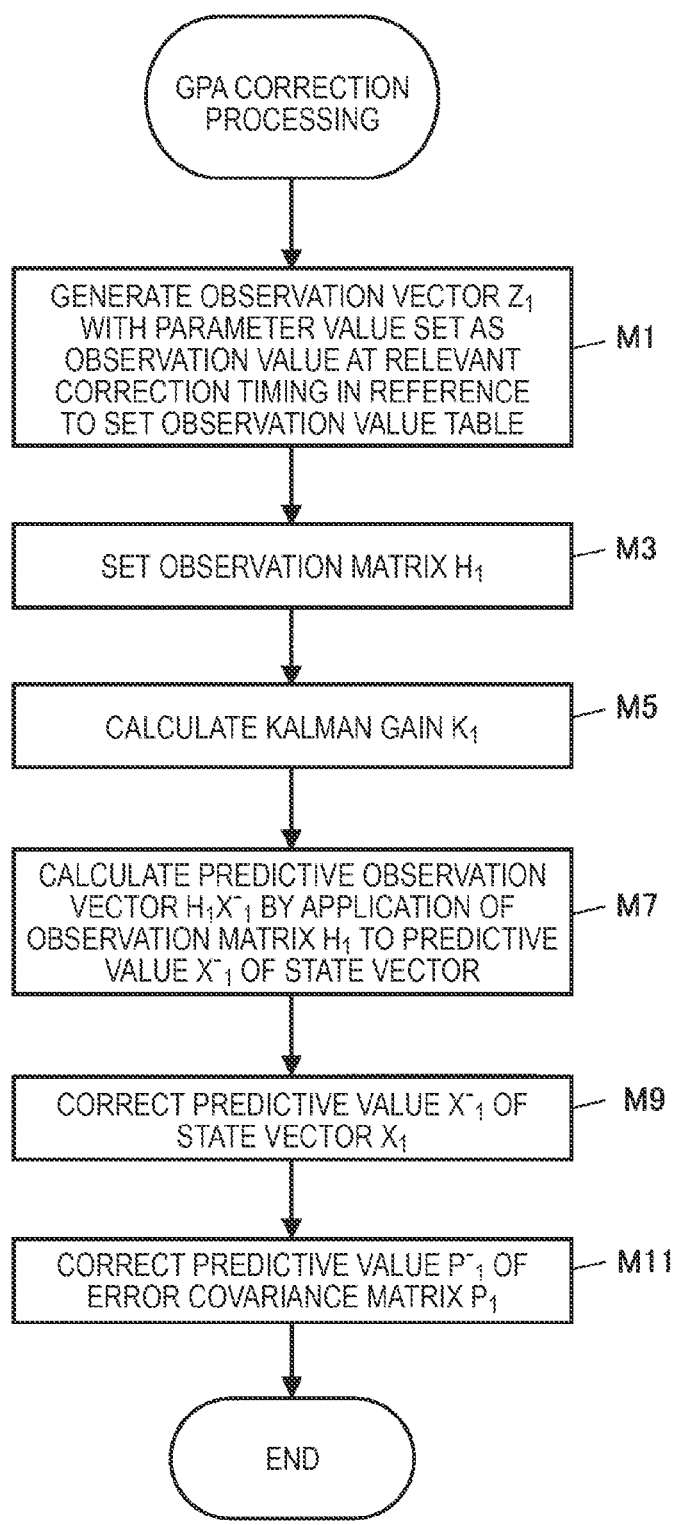
FIG. 8 is a flowchart showing a flow of GPA correction processing.

FIG. 8 is a flowchart showing an example flow of GPA correction processing.

First, the GPA 17 generates an observation vector "$Z_1$", in which the values of parameters as observations values are set at the relevant correction timing, with reference to the observation value table set in Step D1 (Step M1). In one embodiment, the observation vector "$Z_1$" expressed by Equation (4) is generated by using the position and velocity calculated by the GPS unit 100.

$$Z_1 = \begin{bmatrix} \Delta p^{GPS}_{east} \\ \Delta p^{GPS}_{north} \\ \Delta p^{GPS}_{up} \\ v^{GPS}_{east} \\ v^{GPS}_{north} \\ v^{GPS}_{up} \end{bmatrix} \quad (4)$$

Here, "$\Delta p^{GPS}_{east}$", "$\Delta p^{GPS}_{north}$", and "$\Delta p^{GPS}_{up}$" respectively indicate variations in position in the east-west direction, the south-north direction, and the zenith direction calculated by the GPS unit 100. "$v^{GPS}_{east}$", "$v^{GPS}_{north}$", and "$v^{GPS}_{up}$" respectively indicate velocities in the east-west direction, the south-north direction, and the zenith direction calculated by the GPS unit 100.

Next, the GPA 17 sets an observation matrix "$H_1$" which is expressed by Equation (5) (Step M3).

$$H_1 = \begin{bmatrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \end{bmatrix} \quad (5)$$

The observation matrix "H" is a matrix for calculating the respective components included in the observation vector "Z", that is, the predictive values of the respective observation values by application to the predictive value "$X^-$" of the state vector. In one embodiment, as expressed by Equation (5), calculation is carried out by using the observation matrix "$H_1$" in which the diagonal components are all "1" and other components are "0".

Next, the GPA 17 calculates a Kalman gain "$K_1$" by Equation (6) (Step M5).

$$K_1 = P_1^- H_1^T [H_1 P_1^- H_1^T + R_1]^{-1} \quad (6)$$

Here, "$R_1$" is a measurement error matrix that indicates the magnitude of errors, which may be included in the respective components of the observation vector "$Z_1$", that is, the respective observation values.

Next, the GPA 17 calculates a predictive observation vector "$H_1 X_1^-$", which is a predicted observation vector, by applying the observation matrix "$H_1$" set in Step M3 to the predictive value "$X_1^-$" of the state vector calculated by the GPA prediction processing (Step M7).

The GPA 17 corrects the predictive value "$X_1^-$" of the state vector by Equation (7) (Step M9), and corrects the predictive value "$P_1^-$" of the error covariance matrix by Equation (8) (Step M11). Then, the GPA 17 ends the GPA correction processing.

$$X_1^+ = X_1^- + K_1 V_1 = X_1^- + K_1 [Z_1 - H_1 X_1^-] \quad (7)$$

$$P_1^+ = [I - K_1 H_1] P_1^- \quad (8)$$

Here, a superscript "+" indicates a corrective value. "I" indicates a unit matrix.

Returning to FIG. 6, after the GPA correction processing is carried out, the GPA 17 adds the variation "$\Delta p$" in the position included in the corrective value "$X_1^+$" of the state vector "$X_1$" to the position included in the IMU arithmetic result acquired from the IMU position calculation section 11 and obtains the addition result as the calculation result of the position (Step K11). The GPA 17 obtains the velocity "v" included in the corrective value "$X_1^+$" of the state vector "$X_1$" as the calculation result of the velocity (Step K13). Then, the GPA 17 ends the GPA position integration processing.

Returning to the position calculation processing of FIG. 4, after the GPA position integration processing is carried out, the GPA 17 outputs the arithmetic result of the GPA position integration processing to the IMU position calculation section 11 and the direction sensor unit 110 as a GPA arithmetic result (Step D7).

If the GPA arithmetic result is acquired from the GPA 17, the IMU position calculation section 11 carries out inertial navigation arithmetic result calibration processing (Step E11). The inertial navigation arithmetic result calibration processing is processing in which the position and velocity calculated by the inertial navigation arithmetic processing of Step E7 are calibrated by using the position and velocity calculated through the position integration processing by the GPA 17.

Figure 9:
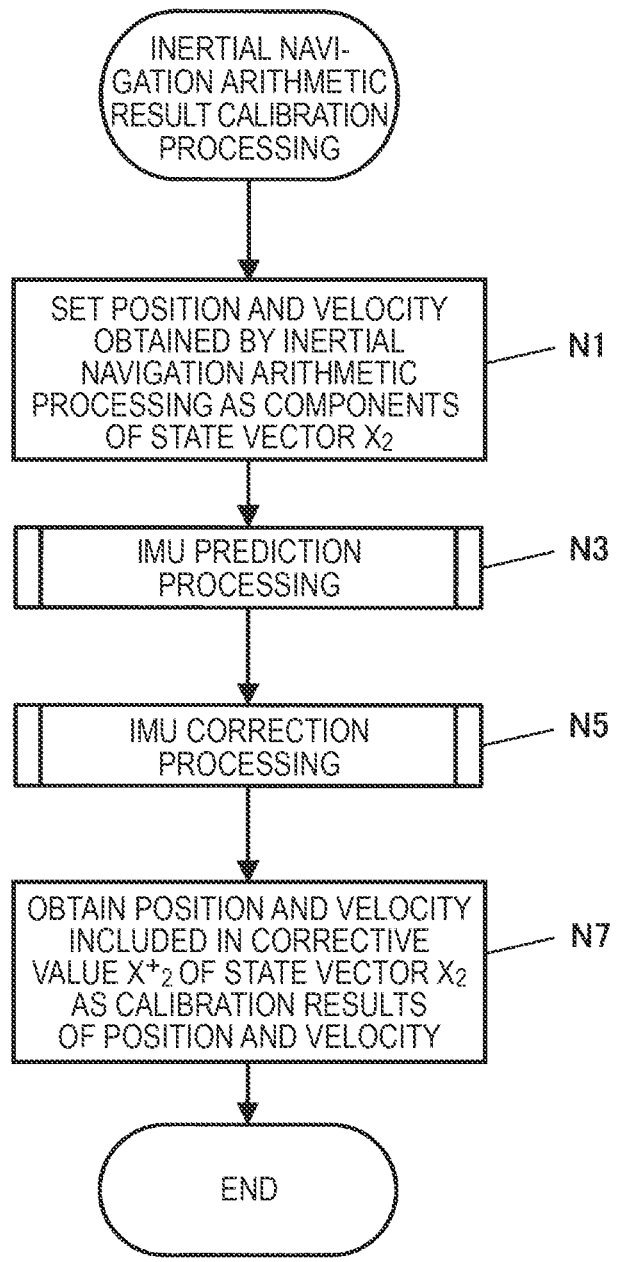
FIG. 9 is a flowchart showing a flow of inertial navigation arithmetic result calibration processing.

FIG. 9 is a flowchart showing an example flow of inertial navigation arithmetic result calibration processing.

First, the IMU position calculation section 11 sets a state vector "$X_2$" that has the position and velocity obtained through the inertial navigation arithmetic processing as components (Step N1). That is, the state vector "$X_2$" expressed by Equation (9) is set.

$$X_2 = \begin{bmatrix} v_{east} \\ v_{north} \\ v_{up} \\ p_{east} \\ p_{north} \\ p_{up} \end{bmatrix} \quad (9)$$

Next, the IMU position calculation section 11 carries out IMU prediction processing (Step N3).

Figure 10:
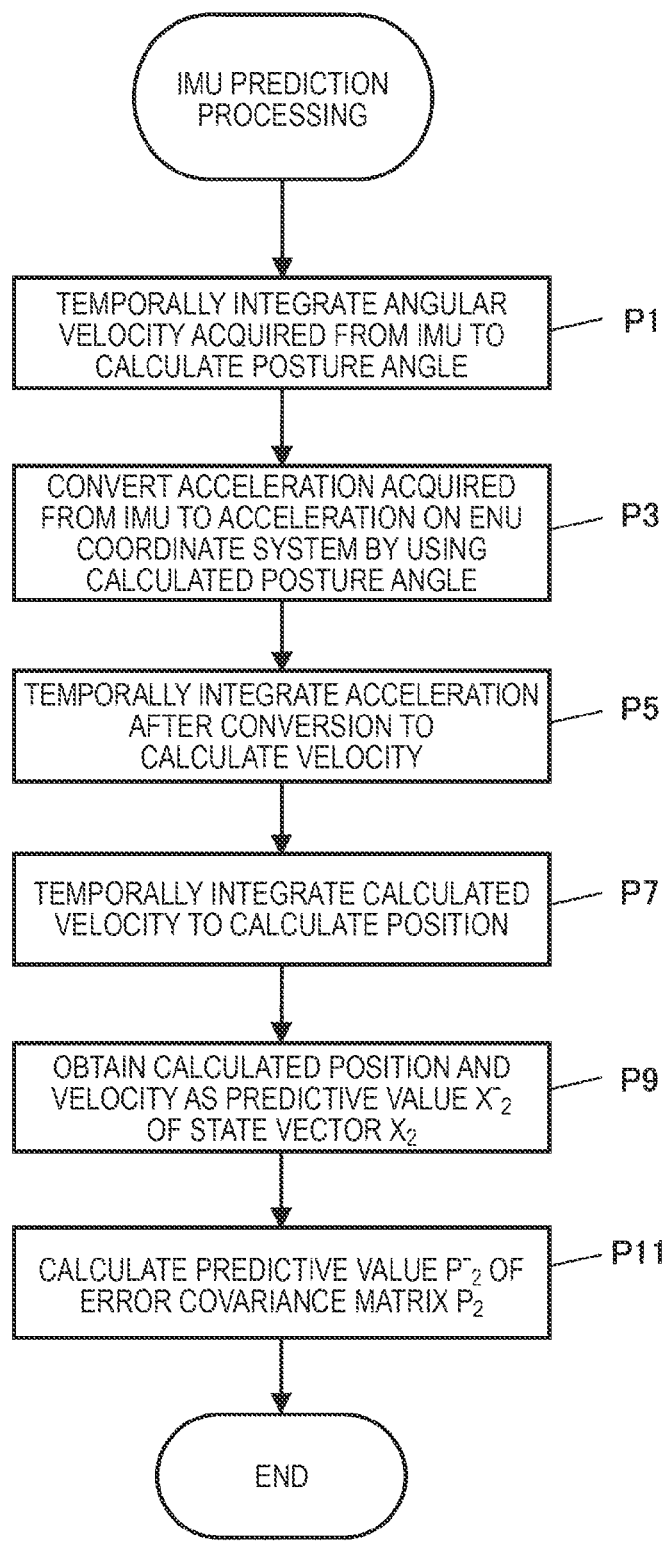
FIG. 10 is a flowchart showing a flow of IMU prediction processing.

FIG. 10 is a flowchart showing an example flow of IMU prediction processing.

First, the IMU position calculation section 11 temporally integrates the angular velocity acquired from the IMU 50 to calculate a posture angle (Step P1).

Next, the IMU position calculation section 11 converts acceleration on the local coordinate system acquired from the IMU 50 to acceleration on the ENU coordinate system (East-North-Up coordinate system) by using the calculated posture angle (Step P3). The conversion of acceleration may be realized by a known coordinate conversion arithmetic operation using the direction detected by the direction sensor unit 110.

Next, the IMU position calculation section 11 temporally integrates the acceleration converted in Step P3 to calculate velocity (Step P5). The IMU position calculation section 11 temporally integrates the calculated velocity to calculate a position (Step P7).

Next, the IMU position calculation section 11 obtains the position and velocity calculated in Step P5 as the predictive value "$X^-_2$" of the state vector (Step P9). The IMU position calculation section 11 carries out a prediction arithmetic operation based on the theory of the Kalman filter to calculate the predictive value "$P^-_2$" of the error covariance matrix (Step P11). Then, the IMU position calculation section 11 ends the IMU prediction processing.

Returning to FIG. 9, after the IMU prediction processing is carried out, the IMU position calculation section 11 carries out IMU correction processing (Step N5).

Figure 11:
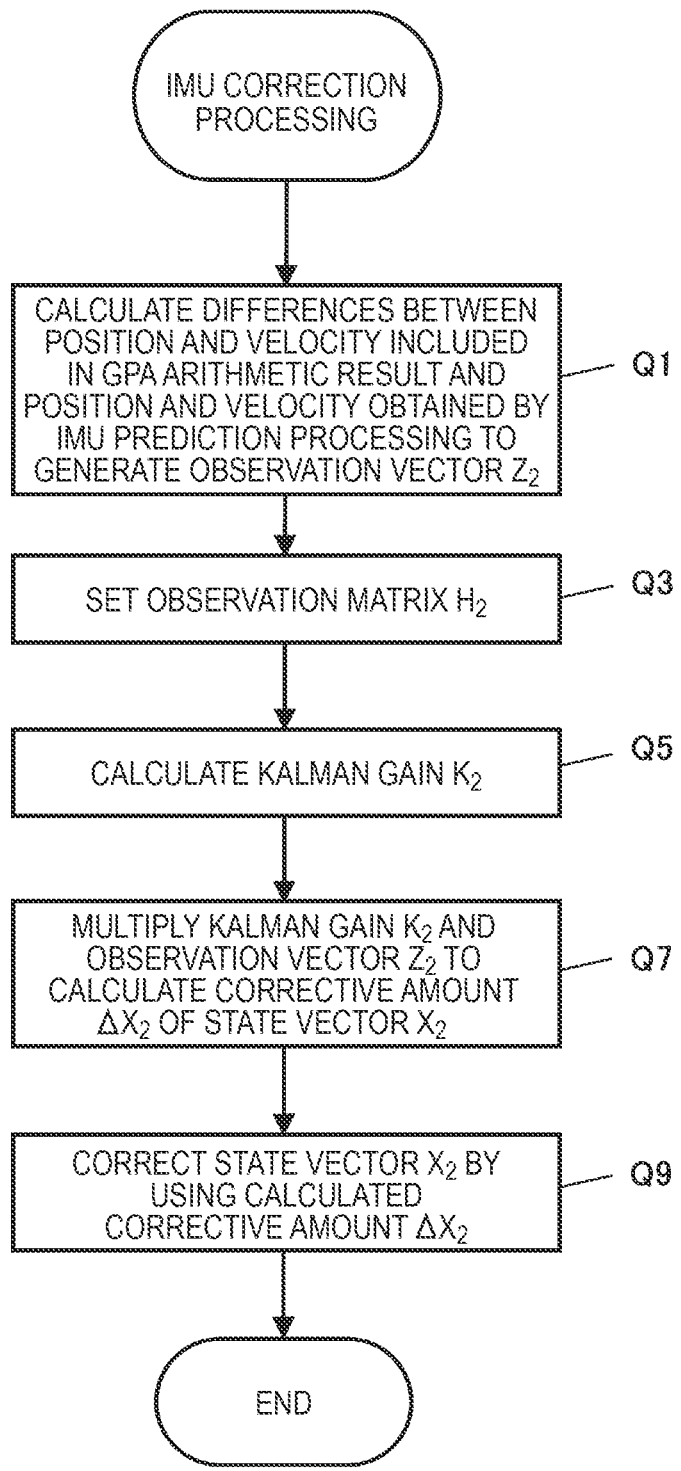
FIG. 11 is a flowchart showing a flow of IMU correction processing.

FIG. 11 is a flowchart showing an example flow of IMU correction processing.

First, the IMU position calculation section 11 calculates the differences between the position and velocity included in the GPA arithmetic result acquired from the GPA 17 and the predictive value "$X^-_2$" of the position and velocity included in the state vector predicted in Step P9 of the IMU prediction processing, thereby generating an observation vector "$Z_2$" (Step Q1). That is, the observation vector "$Z_2$" expressed by Equation (10) is generated.

$$Z_2 = \begin{bmatrix} v^{IMU}_{east} - v^{GPA}_{east} \\ v^{IMU}_{north} - v^{GPA}_{north} \\ v^{IMU}_{up} - v^{GPA}_{up} \\ p^{IMU}_{east} - p^{GPA}_{east} \\ p^{IMU}_{north} - p^{GPA}_{north} \\ p^{IMU}_{up} - p^{GPA}_{up} \end{bmatrix} \quad (10)$$

Here, a superscript "IMU" indicates a predictive value in the IMU prediction processing, and a superscript "GPA" indicates a value included in the GPA arithmetic result.

Next, the IMU position calculation section 11 sets an observation matrix "$H_2$" expressed by Equation (11) (Step Q3).

$$H_2 = \begin{bmatrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \end{bmatrix} \quad (11)$$

The IMU position calculation section 11 calculates a Kalman gain "$K_2$" by Equation (12) (Step Q5).

$$K_2 = P^-_2 H_2^T [H_2 P^-_2 H_2^T + R_2]^{-1} \quad (12)$$

Next, as expressed by Equation (13), the IMU position calculation section 11 calculates a correction amount "$\Delta X_2$" of the state vector by applying the Kalman gain "$K_2$" set in Step Q5 to the observation vector "$Z_2$" generated in Step Q1 (Step Q7).

$$\Delta X_2 = \begin{bmatrix} \Delta v_{east} \\ \Delta v_{north} \\ \Delta v_{up} \\ \Delta p_{east} \\ \Delta p_{north} \\ \Delta p_{up} \end{bmatrix} = K_2 Z_2 = K_2 \begin{bmatrix} v^{IMU}_{east} - v^{GPA}_{east} \\ v^{IMU}_{north} - v^{GPA}_{north} \\ v^{IMU}_{up} - v^{GPA}_{up} \\ p^{IMU}_{east} - p^{GPA}_{east} \\ p^{IMU}_{north} - p^{GPA}_{north} \\ p^{IMU}_{up} - p^{GPA}_{up} \end{bmatrix} \quad (13)$$

The IMU position calculation section 11 corrects the state vector "$X_2$" by using the correction amount "$\Delta X_2$" of the state vector calculated in Step Q7 in accordance with Equation (14) (Step Q9). Then, the IMU position calculation section 11 ends the IMU correction processing.

$$X^+_2 = X^-_2 - \Delta X_2 \quad (14)$$

$$\begin{bmatrix} v_{east} \\ v_{north} \\ v_{up} \\ p_{east} \\ p_{north} \\ p_{up} \end{bmatrix}^+ = \begin{bmatrix} v_{east} \\ v_{north} \\ v_{up} \\ p_{east} \\ p_{north} \\ p_{up} \end{bmatrix}^- - \begin{bmatrix} \Delta v_{east} \\ \Delta v_{north} \\ \Delta v_{up} \\ \Delta p_{east} \\ \Delta p_{north} \\ \Delta p_{up} \end{bmatrix}$$

Returning to FIG. 9, after the IMU correction processing is carried out, the IMU position calculation section 11 obtains the position "p" and velocity "v" included in the corrective value "$X^+_2$" of the state vector "$X_2$" as the calibration result of position and velocity (Step N7). Then, the IMU position calculation section 11 ends the inertial navigation arithmetic result calibration processing.

Returning to the position calculation processing of FIG. 4, after the inertial navigation arithmetic result calibration processing is carried out, the IMU position calculation section 11 carries out IMU calibration standard information calculation processing to calculate information for calibration of the IMU 50 (Step E13). Specifically, processing is carried out in which acceleration is calculated on the basis of the velocities previously and currently acquired from the GPA 17. For example, the acceleration is calculated by differential calculation for variation in velocity per unit time. Then, the acceleration bias and acceleration scale factor, which are kinds of error parameters of the acceleration sensor 51, are calculated by using the acceleration acquired from the IMU 50 and set as IMU calibration standard information.

Next, the IMU position calculation section 11 outputs the IMU calibration standard information calculated in Step E13 to the IMU 50 (Step E15). If the IMU calibration standard information is acquired from the IMU position calculation section 11, the IMU 50 carries out calibration processing of the acceleration sensor 51 (Step G7).

Specifically, the IMU 50 updates the acceleration bias stored therein to the acceleration bias included in the acquired IMU calibration standard information. The IMU 50 also updates the acceleration scale factor stored therein to the acceleration scale factor included in the acquired IMU calibration standard information. Therefore, the acceleration measured by the acceleration sensor 51 is calibrated by the updated acceleration bias and acceleration scale factor.

If the GPA arithmetic result is acquired from the GPA 17, the slot control section 15 outputs the position included in the relevant GPA arithmetic result to the direction sensor unit 110 as the direction sensor calibration standard information (Step F15). If the direction sensor calibration standard information is acquired from the slot control section 15, the in-mounting processing section 111 of the direction sensor unit 110 carries out direction sensor calibration processing by using the direction sensor calibration standard information (Step J5).

With regard to direction sensor calibration, for example, the technique described in JP-A-2001-91257 may be used. That is, the position included in the direction sensor calibration standard information is substituted into the deviation distribution expression of the terrestrial magnetism model stored in advance, and a magnetic deviation at the relevant position is calculated. A true north direction is calculated by using the magnetic direction detected by the direction sensor and the calculated magnetic deviation and the magnetic direction detected by the direction sensor is corrected on the basis of the calculated true north direction.

After a sequence of processings is carried out, the GPA 17 returns to Step D5, the IMU position calculation section 11 returns to Step E3, and the slot control section 15 returns to Step F7. Further, the IMU 50 returns to Step G3, the GPS unit 100 returns to Step H3, and the direction sensor unit 110 returns to Step J3.

3. Advantages

The position calculation system 1, which is a kind of position calculation apparatus, includes the IMU 50 that includes the acceleration sensor 51 and the gyro sensor 53. The position calculation system 1 includes the first slot 60 and the second slot 70, which are unit mounting sections, and is configured to mount the GPS unit 100 or the direction sensor unit 110, which is a kind of sensor unit for detecting a physical event for use in position calculation.

If it is detected that a sensor unit is mounted in any one of the two slots, the slot control section 15 carries out the recognition processing to determine a mounted unit. Specifically, the slot control section 15 inquires the unit information of the mounted sensor unit, and acquires the identification code, output specification information, calibration standard type information, and timing information from the mounted unit. The slot control section 15 identifies the type of the mounted sensor unit in accordance with the acquired identification code.

When it is detected that both the GPS unit 100 and the direction sensor unit 110 are mounted, the IMU position calculation section 11 calculates the angular velocity on the basis of the temporal change in the direction detected by the direction sensor unit 110. The calculated angular velocity is compared with the angular velocity detected by the gyro sensor 53 of the IMU 50, and the angular velocity bias and angular velocity scale factor are calculated as the error parameters for calibration of the gyro sensor 53 and output to the IMU 50. The gyro sensor 53 calibrates the measurement result by using the angular velocity bias and the angular velocity scale factor acquired from the IMU position calculation section 11.

The IMU position calculation section 11 carries out the known inertial navigation arithmetic processing by using the measurement result of the acceleration and angular velocity acquired from the IMU 50 to calculate the position, velocity, and errors, which may be included in the position and velocity. The arithmetic result is output to the slot control section 15 and also output to the GPA 17. The slot control section 15 calculates the GPS calibration standard information, which is calibration standard information for calibration of the GPS unit 100, by using the IMU arithmetic result and outputs the GPS calibration standard information to the GPS unit 100. Next, the GPS unit 100 carries out the satellite tracking processing and the position calculation processing by using the relevant GPS calibration standard information.

The GPS unit 100 outputs the arithmetic result of position and velocity obtained by the position calculation processing to the GPA 17 through the slot control section 15. Next, the GPA 17 carries out the position integration processing with a Kalman filter, which is a kind of filter processing, by using the arithmetic result of the IMU position calculation section 11 and the arithmetic result of the GPS unit 100 to calculate and integrate the positions. At this time, until data is output from the GPS unit 100, the prediction processing is repeatedly carried out in which the position and velocity calculated by the IMU position calculation section 11 are predicted by using the variation in velocity calculated by the IMU position calculation section 11. Next, at the output timing of data from the GPS unit 100, the correction processing is carried out in which the predicted position and predicted velocity are corrected with the position and velocity acquired from the GPS unit 100 as the observation values.

Meanwhile, when the GPS unit 100 is not mounted in the position calculation system 1, the information about the position and velocity is not output from the GPS unit 100, and only the position and velocity calculated through the inertial navigation arithmetic processing by the IMU position calculation section 11 are output to the GPA 17. In this case, therefore, the GPA 17 does not carry out the position integration processing and calculates the position and velocity by using the output of the IMU position calculation section 11.

As described above, when the GPS unit 100 is not mounted in the slot, the inertial navigation arithmetic processing is carried out by using the measurement result of the IMU 50 to calculate the position. Meanwhile, when the GPS unit 100 is mounted, the position is calculated by using the measurement result of the GPS unit 100 and the measurement result of the IMU 50 in accordance with the identification code of the GPS unit 100 recognized by the recognition processing. Therefore, appropriate arithmetic processing can be carried out in accordance with whether a unit is mounted or not to carry out position calculation. As a result, it is possible to flexibly cope with expansion or change of the system (apparatus).

The GPA 17 carries out the position integration processing using a Kalman filter, and the position which is predicted on the basis of the measurement result of the IMU 50 is corrected by using the measurement result of the GPS unit 100. As described above, the position which is predicted by using the measurement result of the previously mounted unit is corrected on the basis of the measurement result of a newly mounted unit by the Kalman filter, such that accuracy of position calculation can be improved and a position closer to a true position can be calculated.

The gyro sensor 53 of the IMU 50 is calibrated by using the angular velocity bias and angular velocity scale factor calculated by using the measurement result of the direction sensor unit 110, and the acceleration sensor 51 of the IMU 50 is calibrated by using the acceleration bias and acceleration scale factor calculated by using the arithmetic result of the GPA 17. Therefore, the IMU 50 can be calibrated by using the measurement result of the mounted sensor unit or a reliable arithmetic result obtained through the position integration processing.

4. Modification 4-1. Mounting of Mounted Unit

In the foregoing embodiment, the case where the GPS unit 100 is mounted in the first slot 60, and the direction sensor unit 110 is mounted in the second slot 70 has been described. However, even when only the GPS unit 100 is mounted or even when only the direction sensor unit 110 is mounted, processing can be carried out in the same manner. Hereinafter, these cases will be described specifically.

(1) When Only GPS Unit is Mounted (A) Recognition Processing

In the recognition processing of FIG. 2, if it is detected that a unit is mounted in the first slot 60 or the second slot 70, the slot control section 15 inquires unit information of the relevant slot. Next, the slot control section 15 receives the unit information from the GPS unit 100, and recognizes that the mounted unit is the GPS unit 100.

(B) Position Calculation Processing

In the position calculation processing of FIGS. 3 and 4, when only the GPS unit 100 is mounted, the slot control section 15 skips Steps F5 to F8. That is, since the direction sensor unit 110 is not mounted, and direction information cannot be acquired, the steps regarding direction sensor initialization information output, angular velocity calculation processing, and angular velocity output are skipped. Thus, the IMU position calculation section 11 skips Steps E3 and E5, and the IMU 50 skips Step G3. In this case, processing (Step F15, Step J5) regarding calibration of the direction sensor is skipped.

(2) When Only Direction Sensor Unit is Mounted (A) Recognition Processing

In the recognition processing of FIG. 2, if it is detected that a unit is mounted in the first slot 60 or the second slot 70, the slot control section 15 inquires unit information of the relevant slot. Next, the slot control section 15 receives the unit information from the direction sensor unit 110, and recognizes that the mounted unit is the direction sensor unit 110.

(B) Position Calculation Processing

In the position calculation processing of FIGS. 3 and 4, when only the direction sensor unit 110 is mounted, the slot control section 15 skips Steps F3, F9, and F11. That is, since the GPS unit 100 is not mounted, the initialization information output of the GPS unit 100, and calculation and output of calibration standard information of the GPS unit 100 are not carried out. In this case, the arithmetic result of position and velocity cannot be acquired from the GPS unit 100. For this reason, the GPA 17 calculates the position and velocity by using the IMU arithmetic result acquired from the IMU position calculation section 11.

4-2. Type of Mounted Unit

A unit that can be mounted in each slot is not limited to the above-described units. For example, as a sensor unit for detecting a physical event for use in position calculation, sensor units, such as a velocity sensor unit, an acceleration sensor unit, and a gyro sensor unit, may be mounted. Further, a unit (position detection unit) for detecting a position using RFID (Radio Frequency IDentification) may be mounted.

The units of the same kind (for example, GPS units) may be mounted in the first slot 60 and the second slot 70. For example, there is a case where two GPS units, first and second GPS units are mounted. In this case, for each of the first and second GPS units, the slot control section 15 calculates information necessary for satellite tracking processing and position calculation processing by the relevant GPS unit, and outputs the calculated information to the relevant GPS unit as GPS calibration standard information. The first and second GPS units carry out the satellite tracking processing and the position calculation processing by using the GPS calibration standard information acquired from the slot control section 15.

The GPA 17 acquires the arithmetic results from the first and second GPS units. Next, position integration processing using a Kalman filter is carried out by using the IMU arithmetic result acquired from the IMU position calculation section 11, the first GPS arithmetic result acquired from the first GPS unit, and the second GPS arithmetic result acquired from the second GPS unit to integrate the positions. In this case, specific processing will be described below.

Although in the foregoing embodiment, a case where an inertial measurement unit (IMU) is mounted in the position calculation system 1 has been described, an inertial navigation system (INS) may be mounted which carries out an inertial navigation arithmetic operation by using the measurement result of the IMU 50 to calculate the position and velocity.

Figure 12:
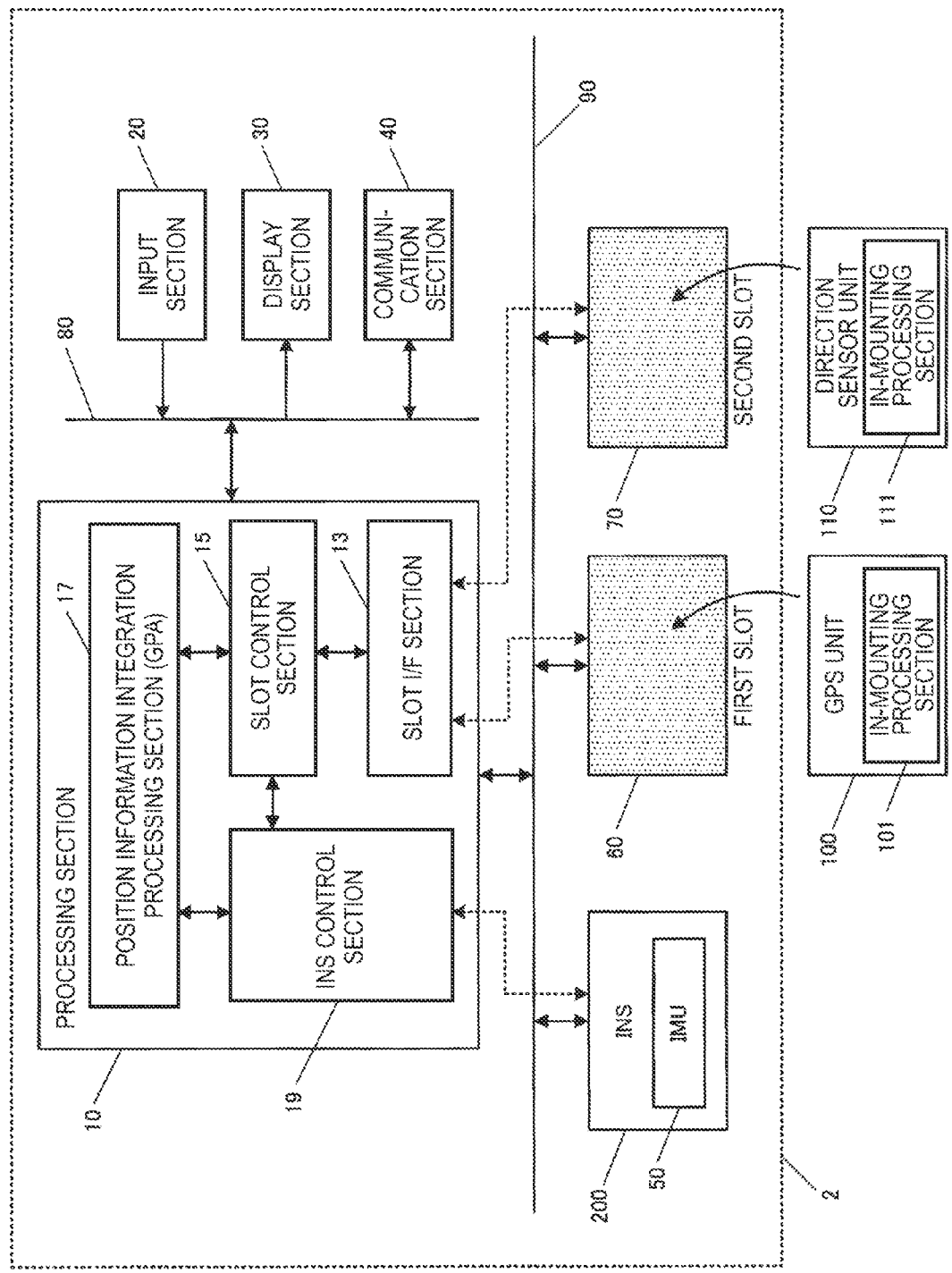
FIG. 12 is a block diagram showing the configuration of a position calculation system according to a modification.

FIG. 12 is a block diagram showing an example of the configuration of a position calculation system 2 of this case. In FIG. 12, the same parts as those in the above-described embodiment are represented by the same reference numerals as those shown FIG. 1, and detailed description will not be repeated. The position calculation system 2 includes an INS 200 having an IMU 50, instead of the IMU 50. The processing section 10 is provided with an INS control section 19, which is a functional section for controlling input/output of data with respect to the INS 200, instead of the IMU position calculation section 11. In the position calculation system 2, the INS 200 carries out inertial navigation arithmetic processing to calculate the position and velocity, and outputs the position and velocity to the INS control section 19.

The INS control section 19 outputs the measurement result acquired from the INS 200 to the GPA 17.

Next, the GPA 17 carries out the GPA position integration processing described with reference to FIG. 6 by using the measurement result of the GPS unit 100 acquired through the slot control section 15 and the measurement result acquired from the INS 200 through the INS control section 19 to calculate the position and velocity.

The GPA 17 outputs the position and velocity calculated by the position integration processing to the INS control section 19. If the arithmetic result of the position and velocity is acquired from the GPA 17, the INS control section 19 outputs the relevant arithmetic result to the INS 200. Next, the INS 200 carries out the inertial navigation arithmetic result calibration processing described with reference to FIG. 9 to calibrate the position and velocity calculated by the inertial navigation arithmetic operation.

4-3. GPA Position Integration Processing

In the foregoing embodiment, a case where in the GPA position integration processing by the GPA 17, the position and velocity are predicted by using the measurement result of the IMU 50, and the predictive value is corrected with the measurement result of the GPS unit 100 as the observation value has been described. This relationship may be reversed. For example, the position and velocity may be predicted by using the measurement result of the GPS unit 100, and the predictive value may be corrected with the measurement result of the IMU 50 as the observation value.

The GPA correction processing may be carried out with the measurement result of a different sensor unit as the observation value as well as with the measurement result of the GPS unit 100 as the observation value. For example, when a GPS unit and a velocity sensor unit are mounted in the position calculation system, first GPA correction processing is carried out in which the predictive value is corrected with the measurement result of the GPS unit 100 as the observation value, and second GPA correction processing is carried out in which the predictive value is corrected with the measurement result of the velocity sensor unit as the observation value.

Specifically, in Step D1 of the position calculation processing of FIG. 3, the GPA 17 generates an observation value table shown in FIG. 13. That is, an observation value table is generated in which, with regard to the GPS unit 100, position and velocity are marked with "○", and with regard to the velocity sensor unit, velocity is marked with "○". In Step D3 of the position calculation processing, the GPA 17 sets the timing at every output time interval of data of the GPS unit 100 as the execution timing (hereinafter, referred to as "first correction timing") of the first GPA correction processing, and sets the timing at every output time interval of data of the velocity sensor unit as the execution timing (hereinafter, referred to as "second correction timing") of the second GPA correction processing.

In Step K7 of the GPA position integration processing of FIG. 6, it is determined whether the first correction timing or the second correction timing set in Step D3 is reached or not. When it is determined that the first correction timing is reached, the first GPA correction processing is carried out, and when it is determined that the second correction timing is reached, the second GPA correction processing is carried out. In the first GPA correction processing, a correction arithmetic operation is carried out by using an observation vector, which has the position and velocity acquired from the GPS unit 100 as the components, in accordance with the observation value table of FIG. 13. In the second GPA correction processing, a correction arithmetic operation is carried out by using the velocity acquired from the velocity sensor unit as the observation value.

The GPA correction processing may be carried out by using the measurement results from the sensor units of the same kind as the observation values. For example, when the first GPS unit and the second GPS unit are mounted in the slots, first GPA correction processing is carried out in which the predicted position and predicted velocity are corrected with the measurement result of the first GPS unit as the observation value, and second GPA correction processing is carried out in which the predicted position and predicted velocity are corrected with the measurement value of the second GPS unit as the observation value.

For example, it is assumed that the first GPS unit is configured to output position and velocity, and the second GPS unit is configured to output only position. In this case, in Step D1 of the position calculation processing of FIG. 3, the GPA 17 generates an observation value table shown in FIG. 14. That is, an observation value table is generated in which, with regard to the first GPS unit, position and velocity are marked with "○", and with regard to the second GPS unit, position is marked with "○". In Step D3 of the position calculation processing, the GPA 17 sets the timing at an output time interval of data of the first GPS unit as the first correction timing, and sets the timing at an output time interval of data of the second GPS unit as the second correction timing.

In Step K7 of the GPA position integration processing of FIG. 6, it is determined whether the first correction timing or the second correction timing set in Step D3 is reached or not. When it is determined that the first correction timing is reached, the first GPA correction processing is carried out, and when it is determined that the second correction timing is reached, the second GPA correction processing is carried out. In the first GPA correction processing, a correction arithmetic operation is carried out by using an observation vector, which has the position and velocity acquired from the first GPS unit as the components, in accordance with the observation value table of FIG. 14. In the second GPA correction processing, a correction arithmetic operation is carried out by using the position acquired from the second GPS unit as the observation value.

4-4. IMU Calibration Processing

Although in the foregoing embodiment, the bias and scale factor stored in the IMU 50 are updated to the bias and scale factor calculated by the IMU position calculation section 11 to calibrate the IMU 50, this processing may be carried out as follows.

That is, the history of the bias and scale factor acquired from the IMU position calculation section 11 is accumulated/stored, and a known linear interpolation arithmetic operation is carried out to estimate the values of current bias and scale factor. Next, the values of the bias and scale factor stored in the IMU 50 are updated to the estimated values of bias and scale factor to calibrate the IMU 50.

4-5. Filter Processing

Although in the foregoing embodiment, an example where the position is calculated by the Kalman filter processing has been described, as a filter for use, a Particle filter, a sigma point filer, or a filter by a least square approach may be used, and filter processing using such a filter may be carried out to calculate the position.

4-6. Satellite Position Calculation Unit

Although in the foregoing embodiments, an example where a GPS unit is used as a satellite position calculation unit has been described, a satellite position calculation unit using a different satellite position calculation system, such as a WAAS (Wide Area Augmentation System), a QZSS (Quasi Zenith Satellite System), a GLONASS (GLObal NAvigation Satellite System), or a GALILEO, may be used.

What is claimed is:

1. A position calculation method executed by a position calculation apparatus, the method comprising:
    determining whether a sensor unit for detecting a physical event for use in position calculation is mounted on the position calculation apparatus, wherein the sensor unit is one of plurality of types of sensor units;
    identifying, when the determining step indicates the sensor unit is mounted on the position calculation apparatus, which of the plurality of types of sensor unit is mounted on the position calculation apparatus;
    acquiring information from the sensor unit, the information representing a kind of data output from the sensor unit; and
    calculating, when the determining step indicates the sensor unit is mounted on the position calculation apparatus, a position by a Kalman filter using an output of an inertial measurement unit integrated with the position calculation apparatus; and
    correcting, when the determining step indicates the sensor unit is mounted on the position calculation apparatus, the Kalman filter by setting an output of the sensor unit as an observation value which corresponds to the kind of data.

2. The method according to claim 1, further comprising:
    calculating, when the determining step indicates the sensor unit is not mounted on the position calculation apparatus, a position using an output of the inertial measurement unit integrated with the position calculation apparatus.

3. The method according to claim 1, further comprising:
    receiving calibration standard type information representing the type of calibration standard information for calibration of the sensor unit;
    calculating calibration standard information responsive to the calibration standard type information and the output of the inertial measurement unit; and
    calibrating the sensor unit by using the calibration standard information.

4. The method according to claim 1, wherein the identifying the type of sensor unit comprises:
    determining that the sensor unit is a satellite position calculation unit configured to calculate a position by using a satellite signal from a position calculation satellite;
    and the method further comprises:
    predicting an initialized position by using a value other than a position calculated by the satellite position calculation unit, and
    correcting the initialized position based at least in part on a position calculated by the satellite position calculation unit.

5. The method according to claim 4, further comprising:
    acquiring information representing a time interval at which the satellite position calculation unit calculates a position,
    wherein the prediction comprises repeatedly predicting a position during the time interval, and the correction comprises correcting the predicted position at the time interval.

6. The method according to claim 1, wherein the identifying the type of sensor unit comprises:
    determining that the sensor unit is a direction sensor unit for measuring a direction of the sensor unit.

7. The method according to claim 6, further comprising:
    receiving the measured direction of the sensor unit; and
    calculating an angular velocity using the received measured direction and a previously acquired direction.

8. The method according to claim 1, wherein the identifying the type of sensor unit comprises:
    identifying two or more types of sensor units mounted on the position calculation apparatus.

9. The method according to claim 8, wherein the two or more types of sensor units include a first type comprising a satellite position calculation unit and a second type comprising a direction sensor unit.

* * * * *